US008918275B2

United States Patent
Sakazaki

(10) Patent No.: US 8,918,275 B2
(45) Date of Patent: Dec. 23, 2014

(54) ACTION HISTORY RECORDING APPARATUS, ACTION HISTORY RECORDING METHOD, AND PROGRAM

(75) Inventor: Naoyuki Sakazaki, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 422 days.

(21) Appl. No.: 13/366,536

(22) Filed: Feb. 6, 2012

(65) Prior Publication Data

US 2012/0209521 A1 Aug. 16, 2012

(30) Foreign Application Priority Data

Feb. 16, 2011 (JP) .................. 2011-030468

(51) Int. Cl.
*G01C 21/00* (2006.01)
*G01C 21/36* (2006.01)
*G06F 17/30* (2006.01)
*G09B 29/10* (2006.01)

(52) U.S. Cl.
CPC ........ *G01C 21/3679* (2013.01); *G01C 21/3617* (2013.01); *G06F 17/30241* (2013.01); *G06F 17/3087* (2013.01); *G06F 17/30876* (2013.01); *G09B 29/10* (2013.01)
USPC ........... 701/408; 701/520; 701/532; 701/426; 701/450; 701/521; 707/740; 707/E17.089; 707/748; 709/204; 715/700

(58) Field of Classification Search
CPC .......... G06F 17/30241; G06F 17/3087; G06F 17/30876; G01C 21/3617; G01C 21/3679; G01C 21/26; G09B 29/10; G08G 1/096877; H04L 51/04; H04L 51/28; H04L 51/38; H04M 1/274516; H04M 2250/58
See application file for complete search history.

(56) References Cited

U.S. PATENT DOCUMENTS 7,856,311 B2 12/2010 Matsuura et al.
8,229,877 B2 7/2012 Sugihara et al.
(Continued)

FOREIGN PATENT DOCUMENTS

CN 1405707 A 3/2003
CN 1751320 A 3/2006
(Continued)

OTHER PUBLICATIONS

Japanese Office Action dated Jun. 11, 2013 (and English translation thereof) in counterpart Japanese Application No. 2011-030468.

(Continued)

*Primary Examiner* — Redhwan K Mawari
(74) *Attorney, Agent, or Firm* — Holtz, Holtz, Goodman & Chick PC

(57) ABSTRACT

With use of GPS, an action-history recording apparatus obtains latitudes and longitudes representing places of user's action where a user is acting, and stores action-history data containing place names indicating the places of user's action at a predetermined processing timing. In the case where, the place of user's action is a specific place unique to the user, where the user visits customarily or frequently, the user is allowed to enter an arbitrary name independent of the latitude and longitude. The name entered by the user is used as a pace name to be contained in action-history data. In this way, the apparatus obtains a place name appropriate for the user and the user can use the name conveniently as the place name of the user's action.

20 Claims, 10 Drawing Sheets

(56) References Cited

U.S. PATENT DOCUMENTS

| | | | |
|---|---|---|---|
| 8,271,497 B2 * | 9/2012 | Ikenoue | 707/740 |
| 2003/0055716 A1 | 3/2003 | Kubota | |
| 2008/0168348 A1 * | 7/2008 | Bergstrom et al. | 715/700 |
| 2009/0312946 A1 * | 12/2009 | Yoshioka et al. | 701/208 |
| 2010/0039529 A1 | 2/2010 | Fujimaki et al. | |
| 2011/0137907 A1 * | 6/2011 | Ikenoue | 707/740 |
| 2012/0209521 A1 * | 8/2012 | Sakazaki | 701/520 |

FOREIGN PATENT DOCUMENTS

| | | |
|---|---|---|
| JP | 2002-342367 A | 11/2002 |
| JP | 2007-293768 A | 11/2007 |
| JP | 2008-123317 A | 5/2008 |
| JP | 2009-093478 A | 4/2009 |
| JP | 2009-151370 A | 7/2009 |
| JP | 2010-045699 A | 2/2010 |
| JP | 2010-072811 A | 4/2010 |
| JP | 2011-253314 A | 12/2011 |
| JP | 2012-103902 A | 5/2012 |
| JP | 2012-128750 A | 7/2012 |
| WO | WO 2008/050711 A1 | 5/2008 |

OTHER PUBLICATIONS

Japanese Office Action dated Mar. 12, 2013 (and English translation thereof) in counterpart Japanese Application No. 2011-030468.
"Chinese Office Action dated Mar. 5, 2014 in counterpart Chinese Application No. 201210031585.4".

* cited by examiner

FIG. 2

| | | WALKING | | EATING A MEAL | | DESK WORK | | ... |
|---|---|---|---|---|---|---|---|---|
| | | AVERAGE | STANDARD DEVIATION | WEIGHTS | AVERAGE | STANDARD DEVIATION | WEIGHTS | AVERAGE | STANDARD DEVIATION | WEIGHTS | |
| BACK AND FORTH | VIBRATION AMPLITUDE | ma1 | σa1 | wa1 | mb1 | σb1 | wb1 | mc1 | σc1 | wc1 | |
| | VIBRATION FREQUENCY | ma2 | σa2 | wa2 | mb2 | σb2 | wb2 | mc2 | σc2 | wc2 | |
| SIDE TO SIDE | VIBRATION AMPLITUDE | ma3 | σa3 | wa3 | mb3 | σb3 | wb3 | mc3 | σc3 | wc3 | |
| | VIBRATION FREQUENCY | ma4 | σa4 | wa4 | mb4 | σb4 | wb4 | mc4 | σc4 | wc4 | |
| UP AND DOWN | VIBRATION AMPLITUDE | ma5 | σa5 | wa5 | mb5 | σb5 | wb5 | mc5 | σc5 | wc5 | |
| | VIBRATION FREQUENCY | ma6 | σa6 | wa6 | mb6 | σb6 | wb6 | mc6 | σc6 | wc6 | |

SORTS OF ACTION

|  | SORTS OF ACTION | | | |
| --- | --- | --- | --- | --- |
|  | WALKING | EATING A MEAL | DESK WORK | ... |
| AVATAR MOVING IMAGE | mov1 | mov2 | mov3 | ... |

ACTION HISTORY RECORDING APPARATUS, ACTION HISTORY RECORDING METHOD, AND PROGRAM

BACKGROUND OF THE INVENTION

1. Field of the Invention

The present invention relates to an action history recording apparatus, an action history recording method, and a computer program, which record information representing places of user's actions as the user's action history.

2. Description of the Related Art

For example, a technology is disclosed in Japanese Patent No. 2009-093478 A (Patent document), which technology obtains a user's personal history of his or her activities with use of a mobile phone equipped with GPS (Global Positioning System). The technology continuously obtains position information (information of latitudes and longitudes) of a user with use of GPS and records the obtained position information together with a time, at which such position information is obtained, as the user's personal history of his or her activities. In the technology, when the user's personal history of his or her activities is recorded, the position information itself is not used without any modification made thereto but place names corresponding to places indicated by such position information are searched for and the history of the user's activities including the searched place names is recorded.

As the above place names to be included in the history of the user's activities are used such names as can be used as objects for traffic, including not only names of intersections, stores, shops, buildings, houses, institutions, facilities, parks, historical scenes, etc. but also names relating to not yet existing buildings and names relating to lost constructions, including lost living quarters of historical figures.

SUMMARY OF THE INVENTION

According to one aspect of the invention, there is provided a place-information obtaining apparatus, which comprises a position detecting unit for detecting a present position to obtain position data, a position storing unit for storing plural pieces of position data previously obtained by the position detecting unit, a converting unit for converting the position data into a place name, a judging unit for judging whether or not position data newly obtained by the position detecting unit coincides with any one of the plural pieces of position data stored in the position storing unit, and a conversion controlling unit for making the converting unit convert the position data newly obtained by the position detecting unit into a place name, when the judging unit determines that the newly obtained position data coincides with one of the plural pieces of position data stored in the position storing unit.

According to another aspect of the invention, there is provided a place-information obtaining method, which comprises a position detecting process of detecting a present position to obtain position data, a storing process of storing in a storing unit plural pieces of position data previously obtained in the position detecting process, a converting process of converting the position data into a place name, a judging process of judging whether or not position data newly obtained in the position detecting process coincides with any one of the plural pieces of position data stored in the storing unit, and a conversion controlling process of converting the newly obtained position data into a place name, when it is determined in the judging process that the newly obtained position data coincides with one of the plural pieces of position data stored in the storing unit.

BRIEF DESCRIPTION OF THE DRAWINGS

FIG. 2 is a conceptual view showing a judgment-reference table.

FIG. 3 is a conceptual view of avatar moving image data ("mov 1", "mov 2", "mov 3", etc.).

DETAILED DESCRIPTION OF THE PREFERRED EMBODIMENTS

Now, preferred embodiments of the present invention will be described in detail. In the present embodiment, disadvantages involved in the above conventional technology are mainly solved, that is, in the above technology, places whose names can be automatically obtained and recorded as the history of the user's activities are limited to such places that are previously given their place names on a general-purpose map and are important among many people. In other words, in the case where a place is important for one person but not important for others, the place name of such place cannot be obtained in the technology. Further, even if such place name of the place has been obtained, the place name will be nothing important. Therefore, although the place is such place where a specific person visits customarily or frequently, such as a workplace or a rendezvous point, the place name indicating the place will be a dray name such as names of intersections and buildings on the general-purpose map, and such place name will not always be a name desired by the specific person.

Therefore, the conventional technology disclosed in the above Patent document involves a disadvantage that the obtained history of activities is simply a record of places of the user's activities and, for example, when the user wants to record the history of activities for one day with use of the technology for purpose of using as a personal diary, the recorded history will not serve conveniently as a diary.

The present invention has been made to solve the above inconvenience involved in the conventional technology, and has a purpose to provide a technique that obtains place names corresponding to places of the user's actions, appropriate and convenient for the user, when recording a personal history of actions.

Figure 1:
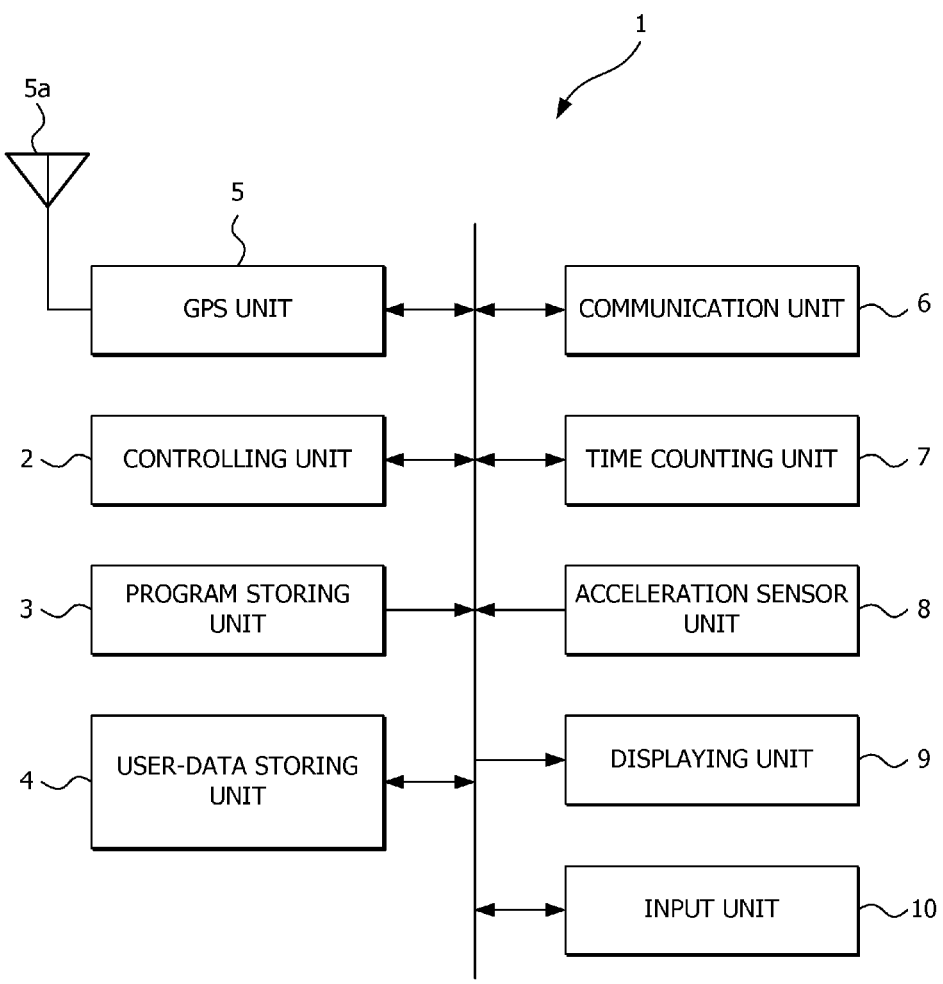
FIG. 1 is a block diagram of an action-history recording apparatus according to the present invention.

FIG. 1 is a block diagram of an action-history recording apparatus 1 according to the present invention. The action-history recording apparatus 1 according to the embodiment of the invention records actions and/or activities of a user, who carries with him or her and uses the action-history recording apparatus 1.

AS shown in FIG. 1, the action-history recording apparatus 1 comprises a controlling unit 2, a program storing unit 3, a user-data storing unit 4, GPS unit 5, a communication unit 6, a time counting unit 7, an acceleration sensor unit 8, a displaying unit 9, and an input unit 10.

Further, the controlling unit 2 comprises CPU (Central Processing Unit), peripheral circuits of CPU and a work memory such as RAM (Random Access Memory). The controlling unit 2 controls the whole operation of the action-history recording apparatus 1.

GPS unit 5 measures a present position of the action-history recording apparatus 1 with use of a well known PGS (Global Positioning System). In other words, GPS unit 5 receives electromagnetic waves transmitted from plural positioning satellites (GPS satellites) through an antenna 5a to obtain position data including a latitude and a longitude, indicating the present position of the action-history recording apparatus 1, and supplies the controlling unit 2 with the obtained position data as position information representing a place of the user's action.

The communication unit 6 has an antenna for sending/receiving an electromagnetic wave, on which a radio signal in conformity with CDMA (Code Division Multiple Access) system is overlapped, and further comprises a modulation/demodulation circuit for modulating/demodulating a signal to be transmitted or received, and an encoding/decoding circuit of a digital signal. Under control of the controlling unit 2, the communication unit 6 operates to connect with other equipment, which is connected with a predetermined communication network (including the Internet) through an arbitrary radio base station, and exchanges data with such equipment in accordance with a predetermined communication protocol. The other equipment stores data base (including map data), which contains the position data including latitudes and longitudes, place-name data corresponding to positions each defined by the position data, and name data representing names of intersections, stores, shops, buildings, houses, institutions, facilities, parks, historical scenes, etc.

The time counting unit 7 serves to count the present time and to supply the controlling unit 2 with time data representing the counted present time. The time counting unit 7 has a calendar function for generating present-date data and present day-of-the-week data and supplies the present-date data and the present day-of-the-week data to the controlling unit 2.

The acceleration sensor unit 8 is composed mainly of an acceleration sensor, an amplifier for amplifying a detection signal from the acceleration sensor, and A/D converter. The acceleration sensor unit 8 detects variations in accelerations of the action-history recording apparatus 1 in three axes to obtain waveform data, and supplies the controlling unit 2 with the waveform data as action information representing an action of the user.

The program storing unit 3 comprises ROM (Read Only Memory), etc, which store various sorts of programs and data required for the controlling unit 2 (particularly, CPU) to control the operation of the action-history recording apparatus 1. In the programs stored in the program storing unit 3 is included a program, which is used by the controlling unit 2 to perform a data obtaining process and a moving image generating process to be described later.

Further, the program storing unit 3 stores a judgment-reference table 101 shown in FIG. 2, which table is used by the controlling unit 2 in the data obtaining process. The judgment-reference table 101 contains plural pieces of judgment-reference data corresponding respectively to plural sorts of actions.

The plural sorts of actions in the judgment-reference table 101 correspond to expected actions of the user, such as "walking", "eating a mean", "desk work" and so on, as shown by example in FIG. 2. The plural sorts of actions can contain "sleeping", "riding a bike", "driving a car", "taking a bus" and "taking a train".

The plural pieces of judgment-reference data represent movements of the action-history recording apparatus 1 indicated by the waveform data, which represents variations in accelerations in the three axes detected by the acceleration sensor unit 8, that is, each of the plural pieces of judgment-reference data represents a feature of each action of the user carrying with him or her the action-history recording apparatus 1.

In particular, the plural pieces of judgment-reference data represent averages, standard deviations and weights of respective vibration frequencies and vibration amplitudes in three directions such as the back and forth direction, the side to side direction, and the up and down direction of the action-history recording apparatus 1. The averages and standard deviations are values, which are previously determined based on data collected from a lot of users carrying the same apparatus as the action-history recording apparatus 1 according to the present embodiment. Logical values determined based on an experimental rule can be used as the judgment-reference data. Meanwhile, the weights are adjustment values for respective pieces of data representing actions, which are previously determined with respect to the features of the movements of the action-history recording apparatus 1.

Further, the program storing unit 3 stores avatar moving image data ("mov 1", "mov 2", "mov 3", etc.) shown in FIG. 3, which data is used in the moving image generating process by the controlling unit 2.

The plural pieces of avatar moving image data are prepared so as to correspond respectively to plural sorts of actions given in the judgment-reference table 101. Each piece of avatar moving image data is moving image data, which represents an avatar moving image consisting of plural frames of still images for a reproducing period of 1 or 2 seconds. The above avatar moving image represents a specific movement of an avatar (a character such as a doll) representing the user. For example, the specific movement of the avatar corresponds to a movement representing "walking" in the case where the sort of action corresponds to "walking".

A data format of the plural pieces of avatar moving image data is not limited, but the avatar moving image data is in conformity with in Motion-JPEG (Joint Photographic Experts Group) format in the present embodiment.

Figure 4A:
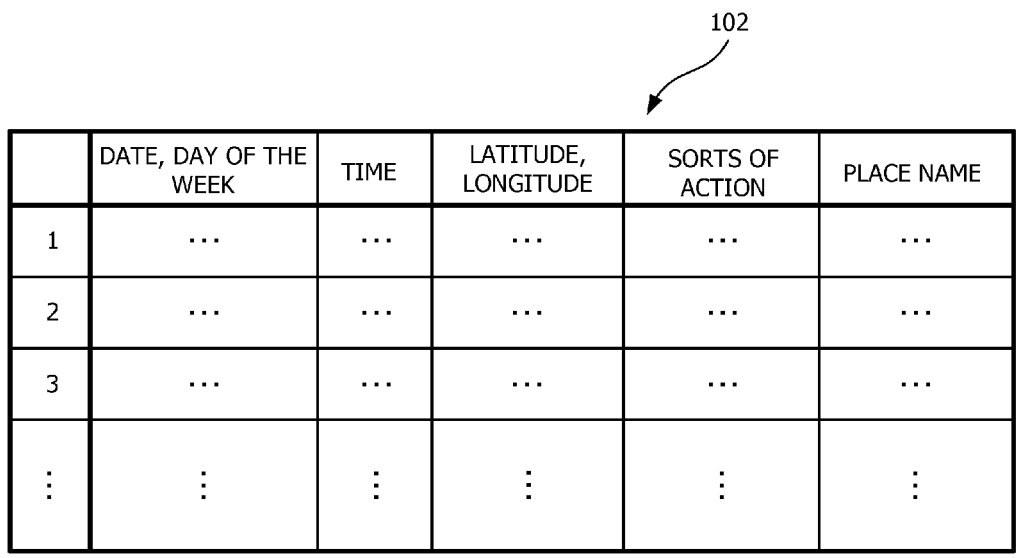
FIG. 4A is a conceptual view of action-history data.
Figure 4B:
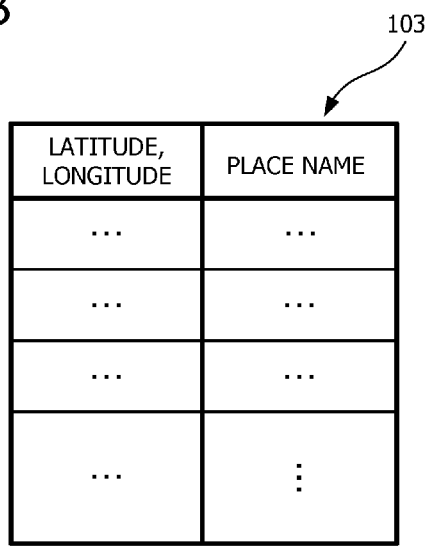
FIG. 4B is a conceptual view of specific place data.

The user-data storing unit 4 comprises a rewritable memory, for example, such as a flash memory built-in the action-history recording apparatus 1 and a detachable memory card. Mainly action-history data 102 shown in FIG. 4A and specific place data 103 shown in FIG. 4B are stored in the user-data storing unit 4 during the data obtaining process performed by the controlling unit 2.

The action-history data 102 represents a history of the user's actions, that is, the action-history data 102 tells what the user has done, when the user has done the thing, and where the user has done the thing. As shown in FIG. 4A, the action-history data 102 comprises a series of data, each piece of data having a serial number (1 to n) and a record or one set of data. The serial number (1 to n) indicates the order, in which data is recorded. One record or one set of data contains data representing a month, day, year, day of the week; a time; a latitude and longitude; a sort of action; and a name of a place. But the action-history data 102 can contain a record having no place-name data.

The data representing a month, day, year, day of the week, and a time contained in the action-history data 102 is obtained by the time counting unit 7, and the data of a latitude and longitude is position data obtained by GPS unit 5. The sort of action corresponds to one of the plural sorts of actions given in the judgment-reference table 101 shown in FIG. 2, and represents an action which the user takes at a time that the controlling unit 2 specifies and also at a place that the controlling unit 2 specifies. The name of a place represents the name of the place defined by the corresponding latitude and longitude. The name of a place is either one of a name obtained by the controlling unit 2, a name generated by the controlling unit 2, and an arbitrary name input by the user.

The specific place data 103 is data relating to a place specific for the user. In the present embodiment, the place specific for the user means a place where the user visits frequently or customarily. As shown in FIG. 4B, the specific place data 103 comprises a series of data, each piece of data contains one record or one set of data. The one record or one set of data contains a latitude and longitude and a name of a place.

The latitude and longitude contained in the specific place data 103 compose position data obtained by GPS unit 5. The name of a place is an arbitrary name, which is entered by the user without any limitation depending on the corresponding latitude and longitude.

The action-history data 102 and the specific place data 103 are unique data to a specific user. Both the data is assigned to a general user. In other words, in the case where the action-history recording apparatus 1 is shared among plural users, the action-history data 102 and the specific place data 103 are recorded for respective users. If the action-history recording apparatus 1 is arranged not to record the action-history data 102 and the specific place data 103 for respective users, but to initialize the recorded data every time a new user will use the apparatus 1, no problem will occur.

The displaying unit 9, for example, comprises a liquid crystal displaying panel and its peripheral circuit, and displays an input screen for allowing the user to enter or choose a name of a place and the avatar moving image described before.

The input unit 10 comprises a power key and other plural keys, which are used by the user to operate the action-history recording apparatus 1, and to designate a name of a place and/or to enter an arbitrary name of a place, and supplies the controlling unit 2 with a key input signal corresponding to a key operation by the user.

In the action-history recording apparatus 1 having the configuration described above, GPS unit 5 functions as place information obtaining means of the invention, and the user-data storing unit 4 functions as action-history information storing means and specific-place information storing means. Further, the controlling unit 2 runs a program stored in the program storing unit 3 to function as judging means, name obtaining means, name providing means, specific-place information adding means, altering means, action-sort information obtaining mean, and diary producing means.

Now, the operation of the action-history recording apparatus 1 according to the present embodiment of the invention will be described in detain. In the action-history recording apparatus 1 are prepared three sorts of operation modes such as an action-history recording mode, a place-name altering mode, and an action-history displaying mode. When the user operates a predetermined key in the input unit 10 and sets one of the operation modes in the action-history recording apparatus 1, the controlling unit 2 operates in accordance with a program stored in the program storing unit 3 to perform a process corresponding to the operation mode. In the following description, it is presumed for sake of simplicity that the action-history data 102 and the specific place data 103 for only one user are recorded in the user-data storing unit 5.

Figure 5:
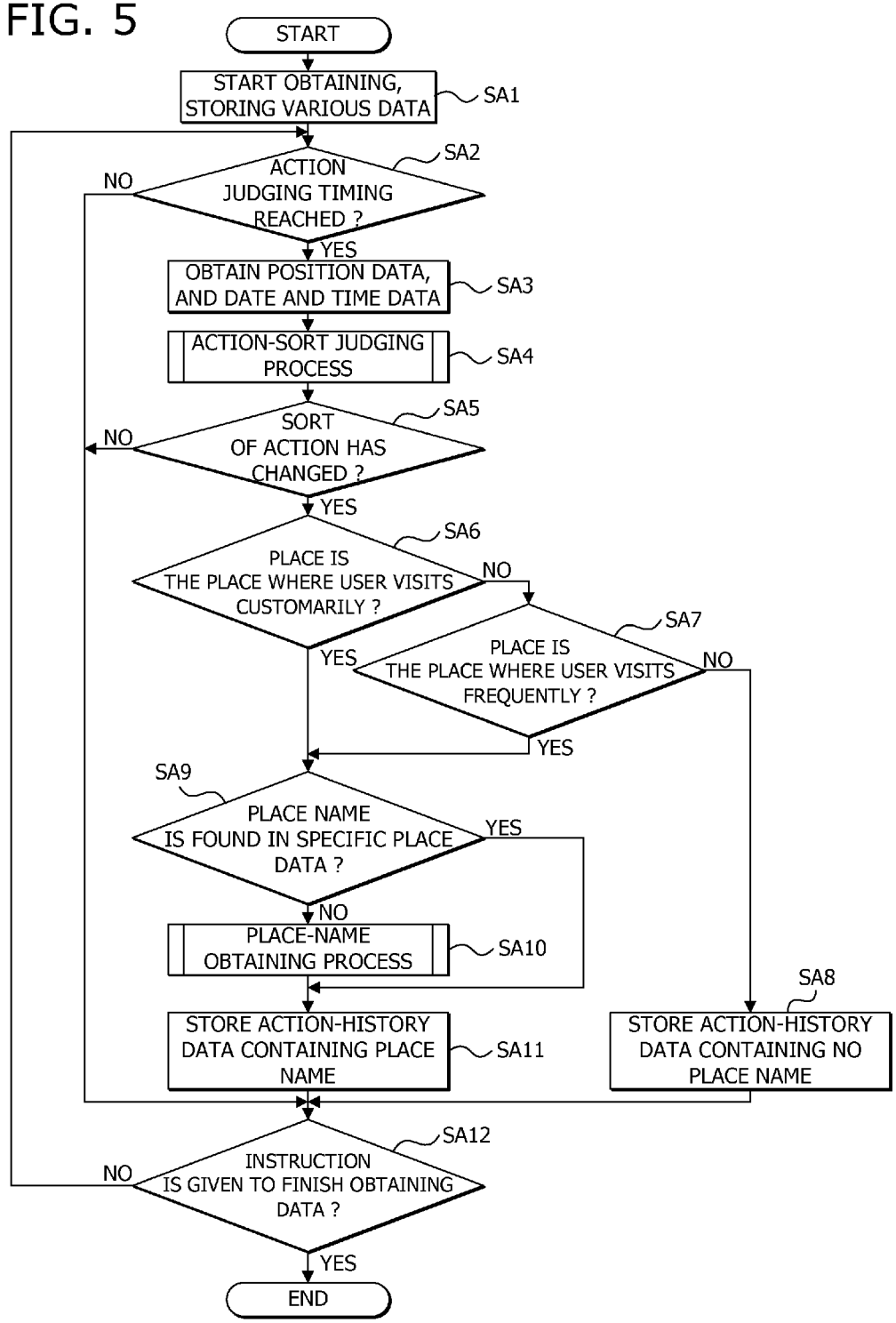
FIG. 5 is a flow chart of a process performed in an action-history recording mode.

FIG. 5 is a flow chart of a process, which is to be performed by the controlling unit 2 when the user sets the action-history recording mode. The action-history recording mode is the operation mode prepared for recording or storing the action-history data 102 (FIG. 4A) in the user-data storing unit 4.

In the action-history recording mode, the controlling unit 2 starts obtaining accelerations in the three axes detected by the acceleration sensor unit 8, and storing in a work memory waveform data representing variations in the detected accelerations (step SA1). At this time, the controlling unit 2 makes GPS unit 5 to measure the present position of the action-history recording apparatus 1.

Then, the controlling unit 2 obtains position data from GPS unit 5, and date and time data from the time counting unit 7 (step SA3) at predetermined time intervals or every time when an action judging timing has reached (YES at step SA2), and then performs an action-sort judging process at step SA4. The above predetermined time interval for the action judging timing is equivalent to a time period, in which waveform data of an acceleration in the axial direction stored in the work memory will be data of a time enough for judging the user's action.

Figure 6:
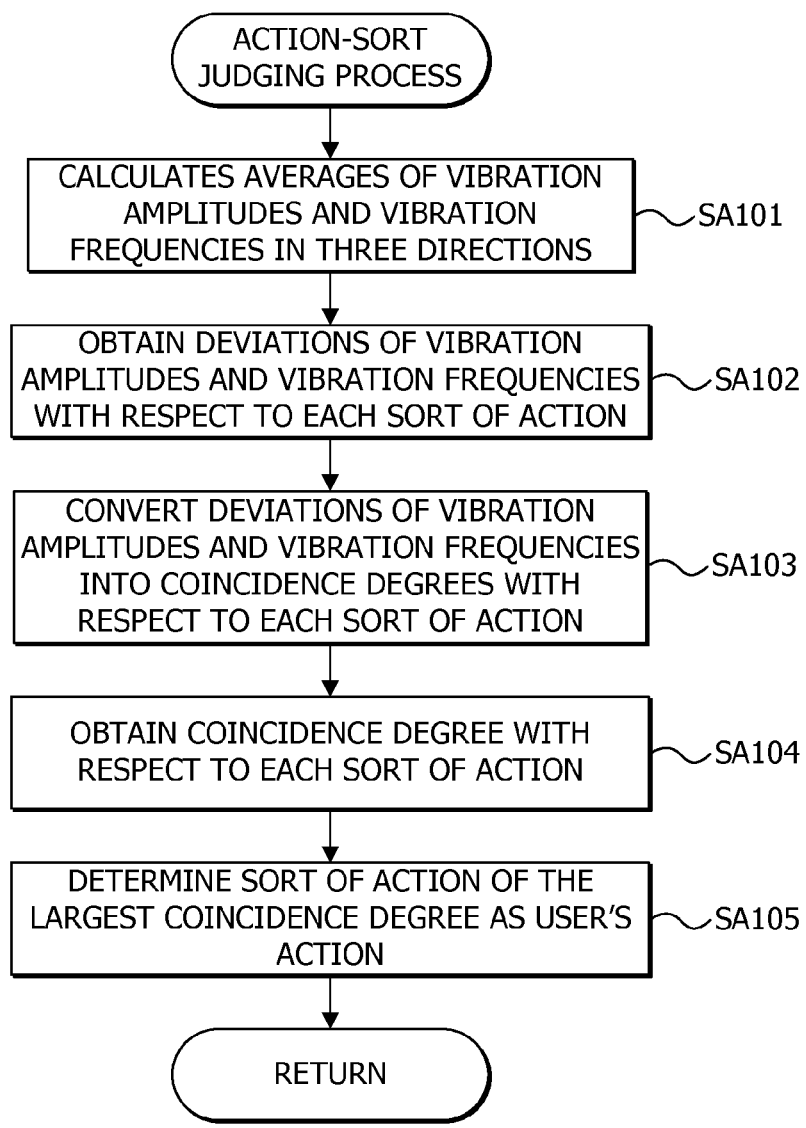
FIG. 6 is a flowchart of an action-sort judging process.

The action-sort judging process is performed to determine which sort of action given in the judgment-reference table 101 (FIG. 2) the present user's action corresponds to. FIG. 6 is a flow chart of the action-sort judging process.

In the action-sort judging process, the controlling unit 2 calculates respective average values of amplitudes and frequencies of movements (vibrations) of the action-history recording apparatus 1 in the three directions, that is, in its the back and forth direction, in the side to side direction, and in the up and down direction with the direction of gravitational force as a reference, based on detection data (acceleration data in the three axial directions) of the acceleration sensor unit 8, which are stored in the work memory during a period from the starting of the process (previous action-sort judging timing) to the current action-sort judging timing (step SA101). At this step, it is assumed for sake of simplicity that the user holds or carries with him or her the action-history recording apparatus 1 in the determined direction.

Then, the controlling unit 2 converts the average values of vibration amplitudes and vibration frequencies in the three directions calculated at step SA101 into deviation values of each sort of action (step SA102). In other words, the controlling unit 2 uses the following equation to convert the average values of vibration amplitudes and vibration frequencies into deviation values of each sort of action:

$$y=(x-m)/\sigma \times 10+50$$

where "y" denotes a deviation value, "x" denotes the calculated average values of vibration amplitudes and vibration frequencies, "m" denotes an average value set for each sort of action in the judgment-reference table 101, and "$\sigma$" denotes the standard deviation.

The controlling unit 2 converts the deviation values of vibration amplitudes and vibration frequencies in the three directions into coincidence degrees with respect to each sort of action (step SA103). In the converting process at step SA103, the controlling unit 2 calculates a difference between the deviation value to be converted and a deviation value ("50") corresponding to the average value set in the judgment-reference table 101. Then, the controlling unit 2 uses the calculated difference between the deviations as a parameter and calculates a formula that gives a result, which becomes larger as a value of the parameter becomes smaller, thereby converting the difference between the deviations into a coincidence degree with respect to each sort of action.

Using weights set to the vibration amplitudes and vibration frequencies respectively in the judgment-reference table 101, the controlling unit 2 calculates, with respect to each sort of action, weighted averages of the coincidence degrees of the vibration amplitudes and vibration frequencies in the three directions converted at step SA103, thereby obtaining a weighted average as the coincidence degree of the user's action with respect to each sort of action (step SA104). The coincidence degree obtained by the controlling unit 2 shows a degree of coincidence between the user's action in a predetermined period of time and a feature of the user's action corresponding to the expected user's action.

The controlling unit 2 determines the sort of action showing the largest coincidence degree as the user's action at present (user's present action), and stores the decided sort of action in the work memory (step SA105). Then, the controlling unit 2 finishes the action-sort judging process. Although not shown in FIG. 6, when it is determined at step SA105 that the largest coincidence degree is not larger than a predetermined threshold value, the controlling unit 2 determines that it is unable to determine the sort of action, and stores information to that effect in the work memory.

Thereafter, the controlling unit 2 returns to the process shown in FIG. 5 and judges at step SA5 whether or not the sort of action determined in the action-sort judging process has changed from the sort of action determined at the last action-sort judging timing. When it is determined at step SA5 that the sort of action has not changed (NO at step SA5), the controlling unit 2 judges at step SA12 whether or not the user has given an instruction to finish obtaining data. When it is determined NO at step SA12, the controlling unit 2 returns to step SA2 and stands by until the following action-sort judging timing reaches.

In the process at step SA5, when it is unable to determine the sort of action in the action-sort judging process, the controlling unit 2 determines that the sort of action has not changed. Although omitted in FIG. 5, in the case where GPS unit 5 has failed at the present action-sort judging timing to measure the present position and the controlling unit 2 cannot obtain the position data from GPS unit 5, the controlling unit 2 performs the processes in the same manner as in the case where the sort of action has not changed. In other words, the controlling unit 2 judges whether or not the user has given an instruction to finish obtaining data at the time, and when it is determined at step SA12 that no instruction has been given (NO at step SA12), the controlling unit 2 returns to step SA2 and stands by until the following action-sort judging timing reaches.

Meanwhile, when it is determined at step SA5 that the sort of action determined in the action-sort judging process has changed from the sort of action determined at the last action-sort judging timing (YES at step SA5), the controlling unit 2 performs the following process to add a new action history to the action-history data 102. A reason for adding the new action history to the action-history data 102 subject to the change in the sort of action is in avoiding unnecessary data being recorded. In other words, in the case where the action history including "what the user did", "when the user did the thing", "where the user did the thing", etc. is recorded to utilize such action history as a diary, the changes in the sort of action corresponding to "what the user did" are often used as a reference, when the diary is written. In the case of utilizing the action history as a diary, it is effective to add an action history to the action-history data 102 as a condition that the sort of action has changed. But in the case where not only the sort of action corresponding to "what the user did", but also a combination of the sort of action corresponding to "where the user did the thing" and the sort of action corresponding to "when the user did the thing" are changed, or in the case where any one of them is changed, it can be determined to add a new action history to the action-history data 102.

When it is determined at step SA5 that the sort of action has changed (YES at step SA5), the controlling unit 2 judges at step SA6 whether or not the present place of the user's action is a place where he or she visits customarily.

In the process at step SA6, the controlling unit 2 judges whether or not "specific action-history data" to be described below is periodically recorded in the user-data storing unit 4. The "specific action-history data" is the action-history data 102 that contains a latitude and longitude indicating a place falling within a range of a position indicated by the position data that is obtained by GPS unit 5 at the present processing timing. More specifically, the controlling unit 2 judges whether or not specific action-history data is recorded every day, or whether or not specific action-history data is recorded on the same days of the week for plural weeks, or whether or not specific action-history data is recorded on the same days for plural months.

When the specific action-history data is periodically recorded in the user-data storing unit 4, the controlling unit 2 determines that the present place of the user's action is the place where he or she visits customarily. On the contrary, when the specific action-history data is not periodically recorded in the user-data storing unit 4, the controlling unit 2 determines that the present place of the user's action is not the place where he or she visits customarily.

When it is determined at step SA6 that the present place of the user's action is not the place where he or she visits customarily (NO at step SA6), the controlling unit 2 judges at step SA7 whether or not the present place of the user's action is a place where he or she visits frequently.

In the process at step SA7, the controlling unit 2 judges whether or not more than predetermined number of pieces of specific action-history data have been recorded in the user-data storing unit 4 in a predetermined period of time. In other words, the controlling unit 2 judges whether or not specific action-history data has been recorded in the user-data storing unit 4 more frequently than a predetermined frequency.

When it is determined at step SA7 that the place of the user's action is neither the place where he or she visits customarily nor the place where he or she visit frequently (NO at step SA7), the controlling unit 2 records new action-history data containing no place name in the user-data storing unit 4 (step SA8). In other words, in the process at step SA8, the controlling unit 2 stores in the user-data storing unit 4 new action-history data, which contains the present month, day, year, day of the week, and a time corresponding to the present processing timing, and the month, day, year, day of the week; a time; a latitude, and a longitude obtained in the process at step SA3, and the sort of action determined in the process at step SA4.

Meanwhile, when it is determined at step SA6 that the present place of the user's action is the place where he or she visits customarily (YES at step SA6), or when it is determined at step SA7 that the present place of the user's action is the place where he or she visits frequently (YES at step SA7), in other words, when it is determined that the present place of the user's action is the specific place unique to the user, the controlling unit 2 refers to the specific place data 103 stored in the user-data storing unit 4, and judges at step SA9 whether or not a place name for specifying the present place of the user's action is found.

In the process at step SA9, the controlling unit 2 judges whether or not a place name corresponding to a latitude and longitude indicating a position, which can be decided to coincide with the present place of the user's action, is found in the specific place data 103. The latitude and longitude indicating the position, which can be decided to coincide with the present place of action, are those indicating a position falling within a predetermined range (having a radius of 10 meters), which has its center at a position indicated by measurement data that is obtained by GPS unit 6 at the present action-sort judging timing.

In the case where the place name corresponding to a latitude and longitude indicating a position, which can be decided to coincide with the present place of action, is found in the specific place data 103, the controlling unit 2 determines that the place name indicating the present acting place really exists. On the contrary, in the case where the place name corresponding to a latitude and longitude indicating a position, which can be decided to coincide with the present place of action, is not found in the specific place data 103, the controlling unit 2 determines that the place name indicating the present place of action does not really exist.

Figure 7:
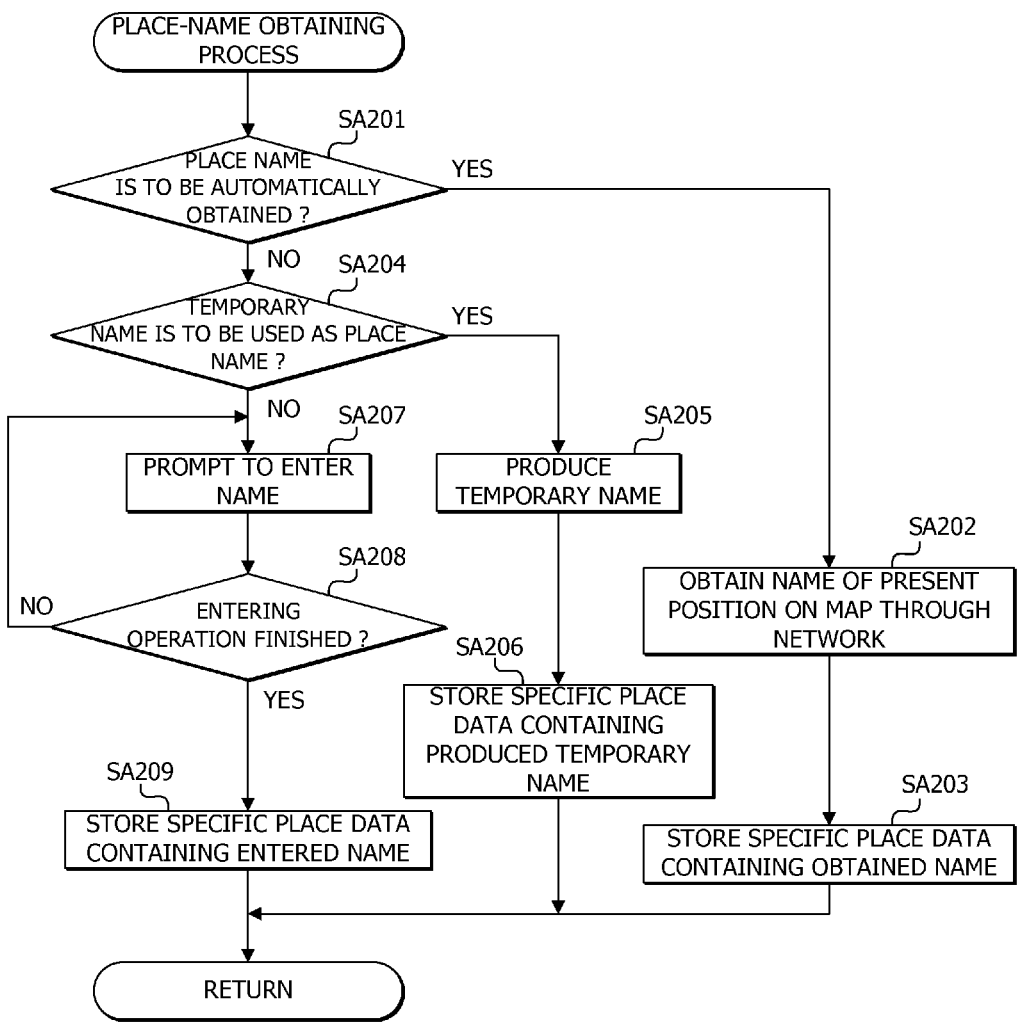
FIG. 7 is a flow chart of a place-name obtaining process.

When it is determined that the place name indicating the present place of action really exists (YES at step SA9), the controlling unit 2 stores in the user-data storing unit 4 new action-history data containing the place name indicating the present place of action previously recorded in the specific place data 103 (step SA11). Meanwhile, when it is determined that the place name indicating the present place of action does not really exist (NO at step SA9), the controlling unit 2 performs a place-name obtaining process at step SA10. FIG. 7 is a flow chart of the place-name obtaining process to be performed at step SA10.

In the place-name obtaining process, the controlling unit 2 displays a previously prepared instruction screen on the displaying unit 9, allowing the user to determine whether he or she automatically obtains a place name to be stored as action-history data or not (step SA201).

When the user has determined to automatically obtain a place name (YES at step SA201), the controlling unit 2 connects with other equipment through the communication unit 6, and obtains (down loads) from said other equipment data including names corresponding to various positions on the map specified by the position data obtained at step SA3 in FIG. 5 (step SA202). The controlling unit 2 obtains from the other equipment names of intersections, stores, shops, buildings, houses, institutions, facilities, parks, historical scenes, etc.

The controlling unit 2 uses the name obtained from the other equipment as a place name and associates the name with the latitude and longitude indicating the present place, obtained at step SA3, and stores new specific place data 103 containing said name in the user-data storing unit 4 (step SA203). Then, the controlling unit 2 finishes the place-name obtaining process, and returns to the process shown in FIG. 5.

Meanwhile, when the user has determined not to automatically obtain a place name (NO at step SA201), the controlling unit 2 displays the previously prepared instruction screen on the displaying unit 9, allowing the user to determine whether he or she uses a temporary name to be stored as the action-history data or not (step SA204).

When the user determines to use a temporary name (YES at step SA204), the controlling unit 2 produces data of a temporary name for the purpose of a temporary use (step SA205). The temporary names are produced in accordance with a predetermined rule by the controlling unit 2. For example, temporary names are given by "place 1", "place 2", "place 3", etc.

The controlling unit 2 sets the produced temporary name as a place name and associates said temporary name with the latitude and longitude indicating the present place, obtained at step SA3, and stores the temporary name as new specific place data 103 in the user-data storing unit 4 (step SA206). Then, the controlling unit 2 finishes the place-name obtaining process, and returns to the process shown in FIG. 5.

On the contrary, when the user determines not to use a temporary name (NO at step SA204), the controlling unit 2 displays a previously prepared name-entering screen on the displaying unit 9, prompting the user to enter a name to be used as a place name (step SA207).

The user enters a name that he or she wants to use to represent the present place, for example, such as a "workplace" and a "rendezvous point".

Thereafter, when the user has given an instruction to finish an entering operation (YES at step SA208), the controlling unit 2 sets the entered name as a place name and associates the entered name with the latitude and longitude indicating the present place, obtained at step SA3, and stores the entered name as new specific place data 103 in the user-data storing unit 4 (step SA209). Then, the controlling unit 2 finishes the place-name obtaining process, and returns to the process shown in FIG. 5.

When the place-name obtaining process finishes at step SA10 in FIG. 5, the controlling unit 2 stores the action-history data containing the new place name recorded in the specific place data 103 as new action-history data in the user-data storing unit 4 (step SA11).

Thereafter, the controlling unit 2 judges at step SA12 whether or not the user has performed a predetermined key operation to give an instruction to finish obtaining data. When it is determined at step SA12 that no instruction has been given to finish obtaining data (NO at step SA12), the controlling unit 2 returns to step SA2 and repeatedly performs the above processes, whereby the user's actions from morning to evening are stored as action-history data in the user-data storing unit 4. Thereafter, when the instruction to finish obtaining data has been given (YES at step SA12), the process finishes in the action-history recording mode.

Figure 8:
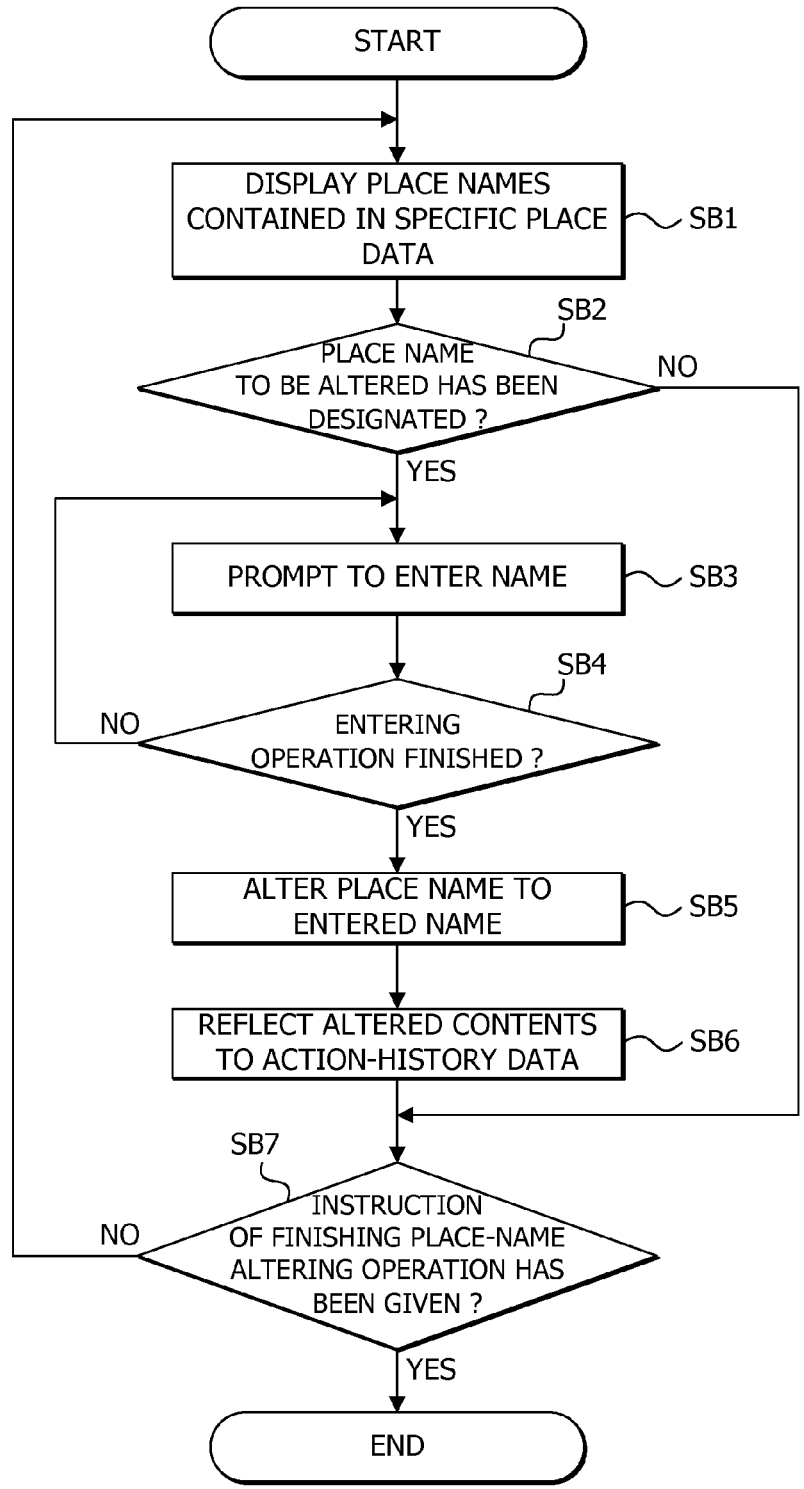
FIG. 8 is a flow chart of a process performed in a place-name altering mode.

Now, the operation of the action-history recording apparatus 1 will be described, which is performed when the place-name altering mode is set by the user. FIG. 8 is a flow chart of a process to be performed by the action-history recording apparatus 1 in the place-name altering mode. The place-name altering mode is an operation mode, in which the place name recorded in the action-history data 102 and/or a place name recorded in the specific place data 103 is altered upon request from the user.

In the place-name altering mode, the controlling unit 2 reads the specific action-history data 103 from the user-data storing unit 4 and displays one and/or all the plural pieces of place-name data contained in the read specific place data 103 on the displaying unit 9 (step SB1). In the process at step SB1, the controlling unit 2 prompts the user to perform a key operation to choose one of the displayed place names and designate one place name to be altered.

Then, when it is determined at step SB2 that the user has designated one place name to be altered (YES at step SB2), the controlling unit 2 displays, for example, the name-entering screen on the displaying unit 9, and prompts the user to enter an arbitrary name to be used as a new place name (step BS3).

When it is confirmed at step SB4 that the user has finished his or her name entering operation (YES at step SB4), the controlling unit 2 alters the place name (designated place name) contained in the specific place data 103 stored in the user-data storing unit 4 to the name newly entered by the user (step SB5).

Further, the controlling unit 2 reflects the altered contents of the specific place data 103 to the action-history data 102 stored in the user-data storing unit 4 (step SB6). In other words, the controlling unit 2 updates the action-history data containing a place name, which has not been altered, so as to contain the name newly entered by the user.

Thereafter, the controlling unit 2 returns to the step SB1 and repeatedly performs the above processes until the user gives an instruction to finish the place-name altering operation (NO at step SB7). When it is determined at step SB7 that the user has given the instruction to finish the place-name altering operation (YES at step SB7), the controlling unit 2 finishes the process in the place-name altering mode.

Figure 9:
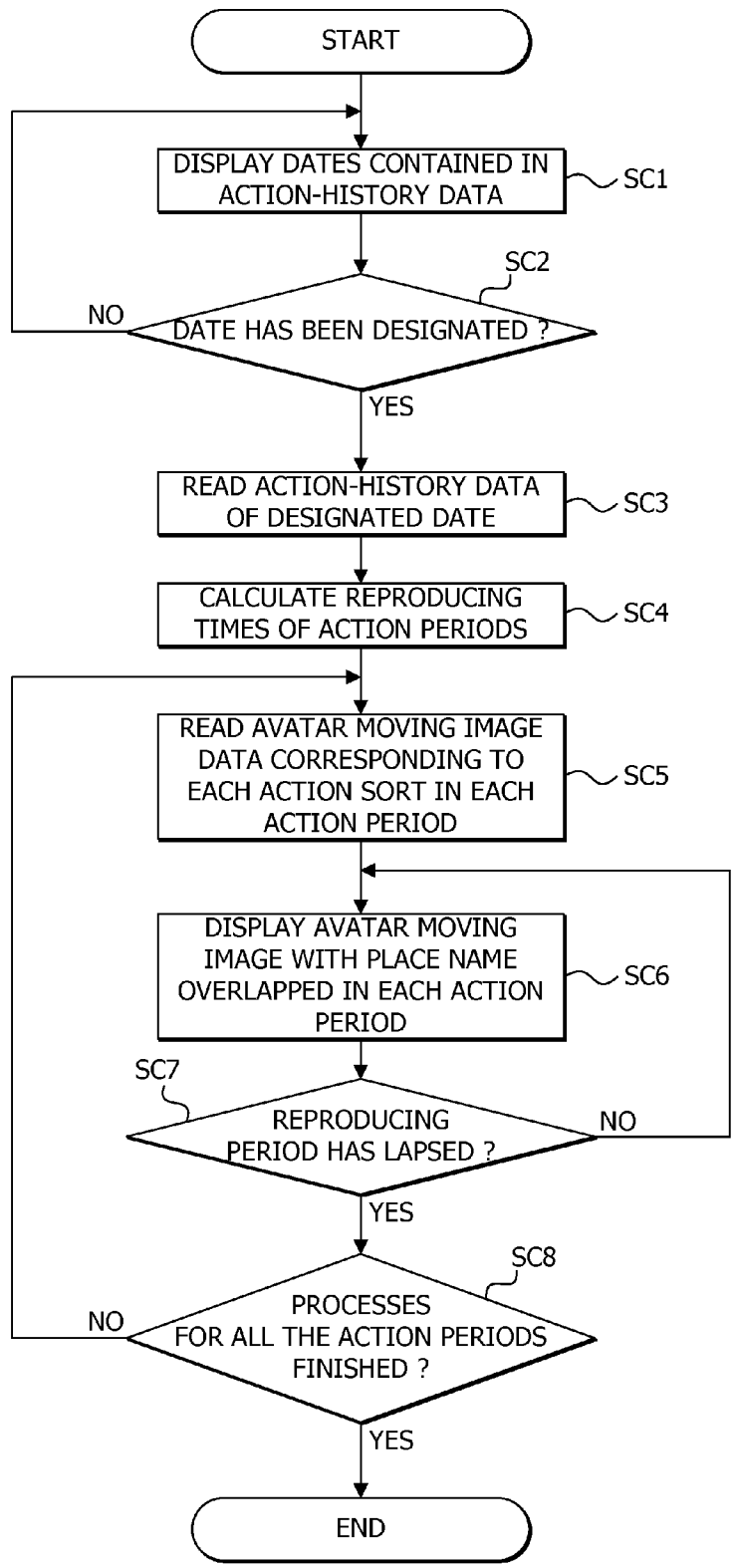
FIG. 9 is a flow chart of a process performed in an action-history displaying mode.

Now, the operation of the action-history recording apparatus 1 in an action-history displaying mode will be described. FIG. 9 is a flow chart of the process to be performed by the controlling unit 2 in the action-history displaying mode. The action-history displaying mode is an operation mode, in which an moving image (hereinafter, an "action-history moving image") of the user's action history from morning to evening is displayed for a predetermined reproducing period of time based on the action-history data 102 stored in the user-data storing unit 4.

In the action-history displaying mode, the controlling unit 2 reads the action-history data 102 from the user-data storing unit 4 and displays date data contained therein on the displaying unit 9 (step SC1). In the process at step SC1, the controlling unit 2 prompts the user to operate a predetermined key to choose a date of an action history to be displayed and designate the date.

Then, when the user has designated the date (YES at step SC2), the controlling unit 2 reads the action-history data 102 of the date designated by the user and stores the read action-history data 102 in the work memory (step SC3). Then, the controlling unit 2 calculates reproducing times of respective action periods indicated by the action-history data within the reproducing time of the action-history moving image (step SC4), wherein the action periods correspond respectively to periods obtained by separating a period, in which the action history for one day is accumulated, by times, at which the sort of the user's action changes.

In the process at step SC4, as a reproducing period of each action period, the controlling unit 2 calculates a time period proportional to a rate of each action period to the accumulated period of the action-history data. More specifically, at first the controlling unit 2 calculates a time period of each action period, and then calculates the following equation to obtain the reproducing period of each action period: $Tn=T2/(T1/tn)$, where to denotes the time period of each action period, T1 denotes an accumulated period of the action-history data, T2 denotes a reproducing period of the action-history moving image, and Tn denotes each reproducing period of each action period.

In short, the controlling unit 2 calculates the reproducing period of each action period, the rate of which to the reproducing period of the action-history moving image will become the same as the rate of each action period to the whole accumulated period of the action-history data.

Figure 10A:
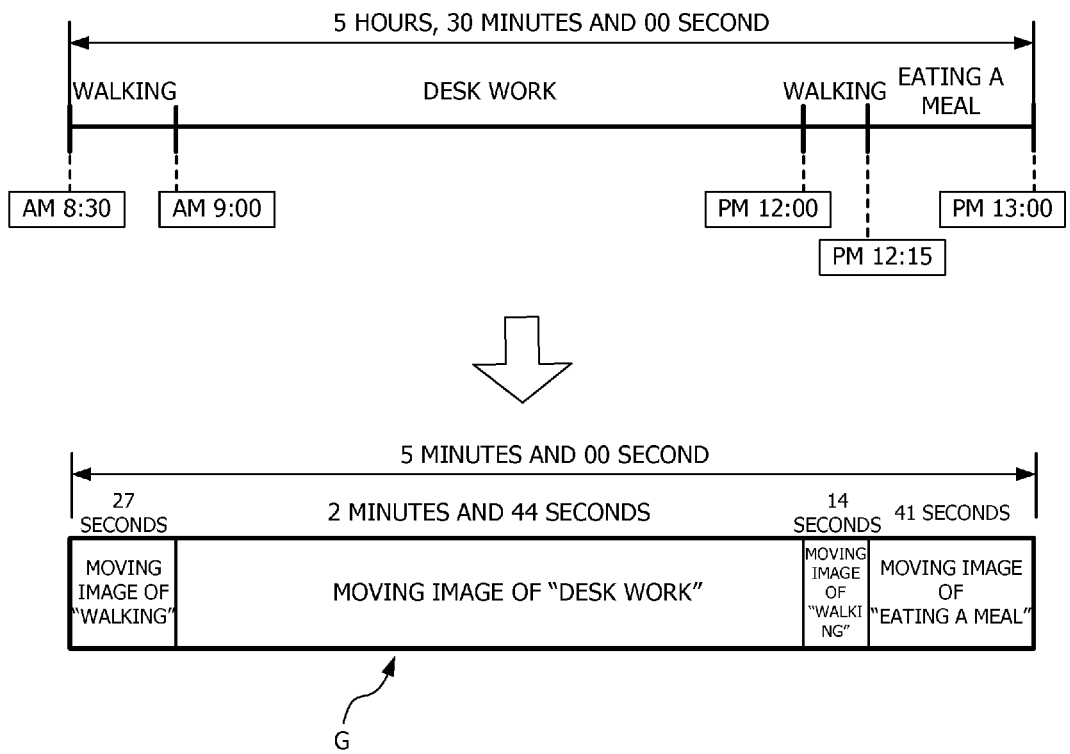
FIG. 10A is a view showing specific examples of reproducing periods in the action-history displaying mode.

FIG. 10A is a view showing specific examples of reproducing periods of respective action periods calculated in the process at step SC4. In FIG. 10A is shown the case that the accumulated period (TOP) of the action-history data for one day is 5 hours, 30 minutes and 00 second, and the reproducing period (BOTTOM) of the action-history moving image G is 5 minutes and 00 second.

As shown in FIG. 10A, the sorts of the user's actions shown by the action-history data are "walking", "desk work", "walking" and "eating a meal". In the case where the first action period ("walking") is 30 minutes, the second action period ("desk work") is 3 hours, the third action period ("walking") is 15 minutes, and the fourth action period ("eating a meal") is 45 minutes, the reproducing periods of the respective action periods will be described below.

The reproducing periods of the respective action periods within the whole reproducing period of the action-history moving image G will be 27 seconds for the first action period, 2 minutes and 44 seconds for the second action period, 14 seconds for the third action period, and 41 seconds for the fourth action period, respectively. The numbers in the reproducing periods are rounded to the seconds.

Having calculated the reproducing periods of the respective action periods, the controlling unit 2 executes the following process during the action periods (from the first action period to the fourth action period) indicated by the action-history data.

The controlling unit 2 reads from the program storing unit 3 avatar moving image data corresponding to the sort of action in the action period to be processed (step SC5). Then, the controlling unit 2 displays an avatar moving image based on the read avatar moving image data on the displaying unit 9 with a place name recorded in the action-history data displayed in an overlapping manner (step SC6). In the case where no place name corresponding to the action period to be processed is recorded, the controlling unit 2 displays only the avatar moving image on the displaying unit 9 in the process at step SC6.

The controlling unit 2 repeatedly displays the avatar moving image with the place name overlapped thereon on the displaying unit 9 until the reproducing period of the action period to be processed has lapsed (NO at step SC7). When the reproducing period of the action period to be processed has lapsed (YES at step SC7, NO at step SC8), the controlling unit 2 repeatedly performs the processes at step SC5 and SC6 for the next action period.

In the case where the sorts of the user's actions represented by the action-history data changes in the order of "walking", "desk work", "walking", and "eating a meal", as shown in FIG. 10A, an action-history moving image G is displayed on the displaying unit 9, including the avatar moving images, such as "walking" image, "desk work" image, "walking" image, and "eating a meal" image, representing respective sorts of actions, such as "walking", "desk work", "walking", and "eating a meal".

Figure 10B:
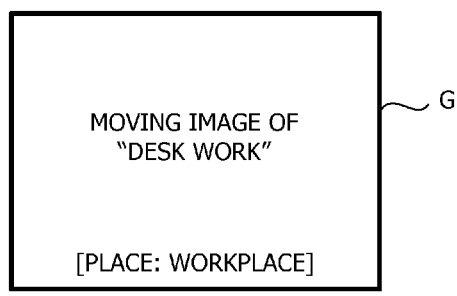
FIG. 10B is a view showing an example of a place name displayed on a displaying unit.

Simultaneously, place names indicating the places of the user's actions in the corresponding action periods are displayed on the displaying unit 9 during the displaying period of the respective avatar moving images. FIG. 10B is a view showing an example of the place name displayed on the displaying unit 9. In FIG. 10B is shown an example of the action-history moving image G, which contains the avatar moving image of the "desk work" image and the place name of "work place".

When the controlling unit 2 finishes the processes at steps SC6 and SC7 for all the action periods or when the controlling unit 2 finishes the process of displaying the avatar moving images and place names (YES at step SC8), the process in the action-history displaying mode finishes.

In the action-history recording apparatus 1, the action history is recorded in the action-history recording mode, wherein the action history indicates what, when, and where the user carrying said apparatus with him or her has done. The action-history recording apparatus 1 records a place name representing a place of the user's action as information in the action history representing a place where the user is acting.

The action-history recording apparatus 1 records not only the place names limited by the present latitude and longitude but also a name not specified by the present latitude and longitude as the place name in the action history, when an instruction is given by the user in the case where the place of the user's action is a specific place where the user visits customarily or frequently. In other words, the action-history recording apparatus 1 records an arbitrary name entered by the user as the place name in the action history, if desired by the user.

In the case where the action-history recording apparatus 1 is shared among plural users, the past action histories of respective users are accumulated, and action patterns of respective users are specified based on the accumulated past action histories. When a new action history is stored, a place important for a user is specified from the specified action pattern of each user, and a name of the place important for the user is specified, and then the new action history of the user with the specified name added is stored. Therefore, when the action history for one day is used as a personal diary, a diary can be produced, which is convenient for each of the users, containing the places proper for the user with appropriate place names added.

The action-history recording apparatus 1 records respective users' specific place data containing position information and corresponding place names. Even if the place of user's action is a place important for a specific user, such as the place where the user visits customarily or frequently, the user is not required to enter the place name and allowed to omit an entering operation of the place name, if the place name of such place is previously recorded. Further, only in the case that the place of user's action is a place important for a specific user, such as the place where the user visits customarily or frequently and that the place name of such place is not recorded in data of the specific user, the user is required to enter the place name of such place, whereby position information and corresponding place name are newly added to the specific place data. Therefore, the action-history recording apparatus 1 is enhanced in the convenience and does not require the user to perform unnecessary operation to designate and/or enter a place name during the action-history recording operation.

In the action-history recording apparatus 1, if required by the user, a temporary name is automatically generated and provided as a place name to be used and stored in the action-history data, and thereafter the stored temporary name can be altered in the place-name altering mode, whereby the enhanced convenience of the apparatus is provided.

If required by the user, the action-history recording apparatus 1 can obtain place names to be recorded in the action-history data from other equipment through the network, thereby providing the user with the enhanced convenience.

Now, modifications to the above described embodiment of the invention will be described. In the action-history recording apparatus 1 according to the above described embodiment, the controlling unit 2 judges based on the action-history data 102 stored in the action-history recording mode, whether or not the present place of the user's action is the specific place where the user visits customarily or frequently. But an modification may be made to the above described embodiment of the invention, such that data consisting only of latitudes and longitudes is stored as data representing the user's action history in addition to the action-history data 102 and it is judged based on such data consisting of latitudes and longitudes, whether or not the present place of the user's action is the specific place.

It is impossible to judge at the initial stage where not so many action histories have not been accumulated in the action-history data 102, whether or not the present place of the user's action is the specific place where the user visits customarily or frequently. Therefore, the modification may be made to the above described embodiment of the invention, such that data of latitudes and longitudes is stored as data representing the places of action at the initial stage and after enough action histories have been stored, it is judged whether or not the present place of the user's action is the specific place.

In the modification, when it is determined that the present place of the user's action is the place where the user visits customarily, the place name entered or designated by the user can be added to the data containing the latitude and longitude indicating the same place as the present place of the user's action in the data (record) recorded in the action-history data 102.

The action-history recording apparatus 1 according to the embodiment of the invention records the sorts of actions representing the action histories or the contents of the user's action are recorded and meanwhile, obtains new action-history data at the time when the content of user's action has changed. But it is not always necessary to include the sort of action in the action history, and when the action history containing no sort of action is recorded, the action-history recording apparatus 1 may be arranged to obtain new action-history data at certain time intervals.

In the embodiment of the invention, the action-history recording apparatus 1 has been described, having the action-history displaying mode, in which an action-history moving image of the user's action-history of one day is displayed based on the recorded action history (action-history data 102). But the action-history recording apparatus 1 can be arranged not to have such action-history displaying mode.

In the action-history recording apparatus 1 having no action-history displaying mode, if the user-data storing unit 4 is provided, for example, in a memory detachable to the action-history recording apparatus 1, the action history (action-history data 102) recorded in the memory can be used on other apparatus. The recorded action history can be used in various manners. For example, the recorded action history will be displayed as a moving image of the user's action history not only for one day but also several days, and also will be used as character information of the user's action history.

Although the modifications and specific embodiment of the present invention have been described in the above detailed description, it will be understood that modifications and variations may be made to the disclosed embodiments and modifications while using the features of the invention and remaining within the scope of the invention as defined by the following claims. The claims described in the foregoing description to define the present invention are attached hereto.

[Claim 1] A place-information obtaining apparatus comprising:

a position detecting unit for detecting a present position to obtain position data, a position storing unit for storing plural pieces of position data previously obtained by the position detecting unit;

a converting unit for converting the position data into a place name;

a judging unit for judging whether or not position data newly obtained by the position detecting unit coincides with any one of the plural pieces of position data stored in the position storing unit; and a conversion controlling unit for making the converting unit convert the position data newly obtained by the position detecting unit into a place name, when the judging unit determines that the newly obtained position data coincides with one of the plural pieces of position data stored in the position storing unit.

[Claim 2] The place-information obtaining apparatus according to claim 1, wherein the converting unit comprises a place-name storing unit for storing plural place names corresponding respectively to the plural pieces of position data, and searches for a place name corresponding to position data to be converted through the plural place names stored in the place-name storing unit, thereby converting the position data into a place name.

[Claim 3] The place-information obtaining apparatus according to claim 2, wherein the place-name storing unit stores position data and a place name corresponding to the position data, with respect to a specific place unique to a user.

[Claim 4] The place-information obtaining apparatus according to claim 2, wherein the converting unit comprises:

a name obtaining unit for obtaining a place name corresponding to position data, when the converting unit fails to find the place name corresponding to said position data among the plural place names stored in the place-name storing unit; and a place-name adding unit for associating the place name obtained by the name obtaining unit with the corresponding position data and for adding and storing said place name in the place-name storing unit.

[Claim 5] The place-information obtaining apparatus according to claim 1, further comprising:

an action-history record controlling unit for sequentially storing in the position storing unit position data obtained by the position detecting unit in combination with a date, on which the position data is obtained, as action-history information representing user's action history, wherein the judging unit judges based on the action-history information stored in the position storing unit, whether or not a place represented by the position data newly obtained by the position detecting unit is a specific place unique to the user.

[Claim 6] The place-information obtaining apparatus according to claim 1, further comprising:

an action-history record controlling unit for sequentially storing in the position storing unit position data obtained by the position detecting unit in combination with a date, on which the position data is obtained, as action-history information representing user's action history; and an action-history display controlling unit for displaying the place name converted by the conversion controlling unit in place of the position data, when displaying the action-history information stored in the position storing unit.

[Claim 7] The place-information obtaining apparatus according to claim 1, further comprising:

an action-history record controlling unit for sequentially storing in the position storing unit position data obtained by the position detecting unit in combination with a date, on which the position data is obtained, as action-history information representing user's action history, wherein when the converting unit has converted position data into a place name, the action-history record controlling unit uses said place name in place of the position data to store action-history information.

[Claim 8] The place-information obtaining apparatus according to claim 5, wherein the judging unit determines that a place of the user's action is the specific place unique to the user, when position data is periodically stored in the position storing unit, which data represents a place that can be determined to be the same as the place of the user's action represented by the position data newly obtained by the position detecting unit.

[Claim 9] The place-information obtaining apparatus according to claim 5, wherein the judging unit determines that a place of the user's action is the specific place unique to the user, when position data is stored in the position storing unit with higher frequency than a predetermined level, which data represents a place that can be determined to be the same as the place of the user's action represented by the position data newly obtained by the position detecting unit.

[Claim 10] The place-information obtaining apparatus according to claim 4, wherein the name obtaining unit obtains a name determined by a user as a place name corresponding to the position data.

[Claim 11] The place-information obtaining apparatus according to claim 4, wherein the name obtaining unit obtains a name of an indication such as a place and building, which is stored at a position in map data indicated by position data, as a place names corresponding to the position data.

[Claim 12] The place-information obtaining apparatus according to claim 4, wherein the name obtaining unit obtains a place name corresponding to the position data from other equipment through a network.

[Claim 13] The place-information obtaining apparatus according to claim 4, further comprising: a name providing unit for providing a temporary place name to a user, wherein the name obtaining unit obtains the temporary place name provided from the name providing unit.

[Claim 14] The place-information obtaining apparatus according to claim 13, further comprising:

an altering unit for altering the place name stored in the place-name storing unit in accordance with a request from the user.

[Claim 15] The place-information obtaining apparatus according to claim 5, further comprising:

an action-sort information obtaining unit for obtaining action-sort information representing a sort of an action taken by the user when position data has been obtained by the position detecting unit, wherein the action-history record controlling unit sequentially stores in the position storing unit the position data obtained by the position detecting unit, in combination with a date, on which the position data is obtained, and the action-sort information obtained by the action-sort information obtaining unit, as action-history information representing user's action history.

[Claim 16] The place-information obtaining apparatus according to claim 15, further comprising:

a diary producing unit for producing an action diary representing the positions of the user's actions, dates and times, and the sorts of the user's actions, based on the action-history information stored in the position storing unit.

[Claim 17] The place-information obtaining apparatus according to claim 16, wherein the diary producing unit produces an action-history moving image as the action diary, in which moving images representing respective sorts of actions indicated by the action-sort information are connected in the recorded order of corresponding action-sort information, wherein the moving images are expressed by movements of a character representing the user.

[Claim 18] The place-information obtaining apparatus according to claim 17, wherein the diary producing unit produces the action-history moving image, in which place names indicating places of the user's actions are displayed on the respective moving images in an overlapping manner.

[Claim 19] A place-information obtaining method comprising:

a position detecting process of detecting a present position to obtain position data;

a storing process of storing in a storing unit plural pieces of position data previously obtained in the position detecting process;

a converting process of converting the position data into a place name;

a judging process of judging whether or not position data newly obtained in the position detecting process coincides with any one of the plural pieces of position data stored in the storing unit; and a conversion controlling process of converting the newly obtained position data into a place name, when it is determined in the judging process that the newly obtained position data coincides with one of the plural pieces of position data stored in the storing unit.

What is claimed is:

1. A place-information obtaining apparatus comprising:
   a position detecting unit for detecting a present position to obtain position data;
   a position storing unit for storing plural pieces of position data previously obtained by the position detecting unit as action-history information;
   a place-name storing unit for storing specific place data, the specific place data comprising plural place names respectively corresponding to the plural pieces of position data;
   a converting unit for converting the position data into a place name by searching for a place name corresponding to the position data to be converted from among the plural place names stored in the place-name storing unit;
   a judging unit for judging whether or not position data newly obtained by the position detecting unit coincides with any one of the plural pieces of position data stored in the position storing unit; and
   a conversion controlling unit for making the converting unit convert the position data newly obtained by the position detecting unit into a place name, when the judging unit determines that the newly obtained position data coincides with one of the plural pieces of position data stored in the position storing unit;
   wherein the place-name storing unit stores the specific place data such that the specific place data corresponds to a specific user.

2. The place-information obtaining apparatus according to claim 1, wherein the converting unit comprises:
   a name obtaining unit for obtaining a place name corresponding to position data, when the converting unit fails to find the place name corresponding to said position data among the plural place names stored in the place-name storing unit; and
   a place-name adding unit for associating the place name obtained by the name obtaining unit with the corresponding position data and for adding and storing said place name in the place-name storing unit.

3. The place-information obtaining apparatus according to claim 1, further comprising:
   an action-history record controlling unit for sequentially storing in the position storing unit, as the action-history information which represents an action history of a user, position data obtained by the position detecting unit in combination with a date on which the position data is obtained,
   wherein the judging unit judges, based on the action-history information stored in the position storing unit, whether or not a place represented by the position data newly obtained by the position detecting unit is a specific place unique to the user.

4. The place-information obtaining apparatus according to claim 1, further comprising:
   an action-history record controlling unit for sequentially storing in the position storing unit, as the action-history information which represents an action history of a user, position data obtained by the position detecting unit in combination with a date on which the position data is obtained; and
   an action-history display controlling unit for displaying the place name converted by the conversion controlling unit in place of the position data, when displaying the action-history information stored in the position storing unit.

5. The place-information obtaining apparatus according to claim 1, further comprising:
   an action-history record controlling unit for sequentially storing in the position storing unit, as the action-history information which represents an action history of a user, position data obtained by the position detecting unit in combination with a date on which the position data is obtained,
   wherein when the converting unit has converted position data into a place name, the action-history record controlling unit uses said place name in place of the position data to store the action-history information.

6. The place-information obtaining apparatus according to claim 3, wherein the judging unit determines that a place in the action history of the user is the specific place unique to the user, when position data (i) is periodically stored in the position storing unit and (ii) represents a place that can be determined to be the same as the place represented by the position data newly obtained by the position detecting unit.

7. The place-information obtaining apparatus according to claim 3, wherein the judging unit determines that a place in the action history of the user is the specific place unique to the user, when position data (i) is stored in the position storing unit with a frequency higher than a predetermined frequency and (ii) represents a place that can be determined to be the same as the place represented by the position data newly obtained by the position detecting unit.

8. The place-information obtaining apparatus according to claim 2, wherein the name obtaining unit obtains a name determined by a user as the place name corresponding to the position data.

9. The place-information obtaining apparatus according to claim 2, wherein the name obtaining unit obtains a name of an indication such as a place and building, which is stored at a position in map data indicated by position data, as the place name corresponding to the position data.

10. The place-information obtaining apparatus according to claim 2, wherein the name obtaining unit obtains the place name corresponding to the position data from other equipment through a network.

11. The place-information obtaining apparatus according to claim 2, further comprising:
    a name providing unit for providing a temporary place name to a user, wherein the name obtaining unit obtains the temporary place name provided from the name providing unit.

12. The place-information obtaining apparatus according to claim 11, further comprising:
an altering unit for altering the place name stored in the place-name storing unit in accordance with a request from the user.

13. The place-information obtaining apparatus according to claim 3, further comprising:
an action-type information obtaining unit for obtaining action-type information representing a type of an action taken by the user when position data has been obtained by the position detecting unit,
wherein the action-history record controlling unit sequentially stores in the position storing unit, as the action-history information representing the action history of the user, the position data obtained by the position detecting unit in combination with the date on which the position data is obtained and the action-type information obtained by the action-type information obtaining unit.

14. The place-information obtaining apparatus according to claim 13, further comprising:
a diary producing unit for producing an action diary representing positions, dates, times, and types of actions of the user based on the action-history information stored in the position storing unit.

15. The place-information obtaining apparatus according to claim 14, wherein the diary producing unit produces an action-history moving image as the action diary, in which moving images representing respective types of actions indicated by the action-type information are connected in an order in which the corresponding action-type information was recorded, wherein the moving images are expressed by movements of a character representing the user.

16. The place-information obtaining apparatus according to claim 15, wherein the diary producing unit produces the action-history moving image such that place names indicating places of the actions of the user are displayed on the respective moving images in an overlapping manner.

17. A place-information obtaining method comprising:
a position detecting process of detecting a present position to obtain position data;
a storing process of storing in a storing unit (i) plural pieces of position data previously obtained in the position detecting process as action-history information, and (ii) specific place data comprising plural place names respectively corresponding to the plural pieces of position data;
a converting process of converting the position data into a place name by searching for a place name corresponding to the position data from among the plural place names stored in the storing unit;
a judging process of judging whether or not position data newly obtained in the position detecting process coincides with any one of the plural pieces of position data stored in the storing unit; and
a conversion controlling process of converting the newly obtained position data into a place name, when it is determined in the judging process that the newly obtained position data coincides with one of the plural pieces of position data stored in the storing unit;
wherein the storing unit stores the specific place data such that the specific place data corresponds to a specific user.

18. The place-information obtaining apparatus according to claim 1, wherein the place-name storing unit stores the specific place data for each of a plurality of users, the specific place data being different for each of the plurality of users.

19. The place-information obtaining apparatus according to claim 18, wherein the position storing unit stores the plural pieces of position data as the action-history information such that the action-history information is specific to the specific user.

20. The place-information obtaining apparatus according to claim 19, wherein the action-history information is specific to the specific user from among the plurality of users, each of the plurality of users having different action-history information specific thereto.

* * * * *